Patented July 25, 1950

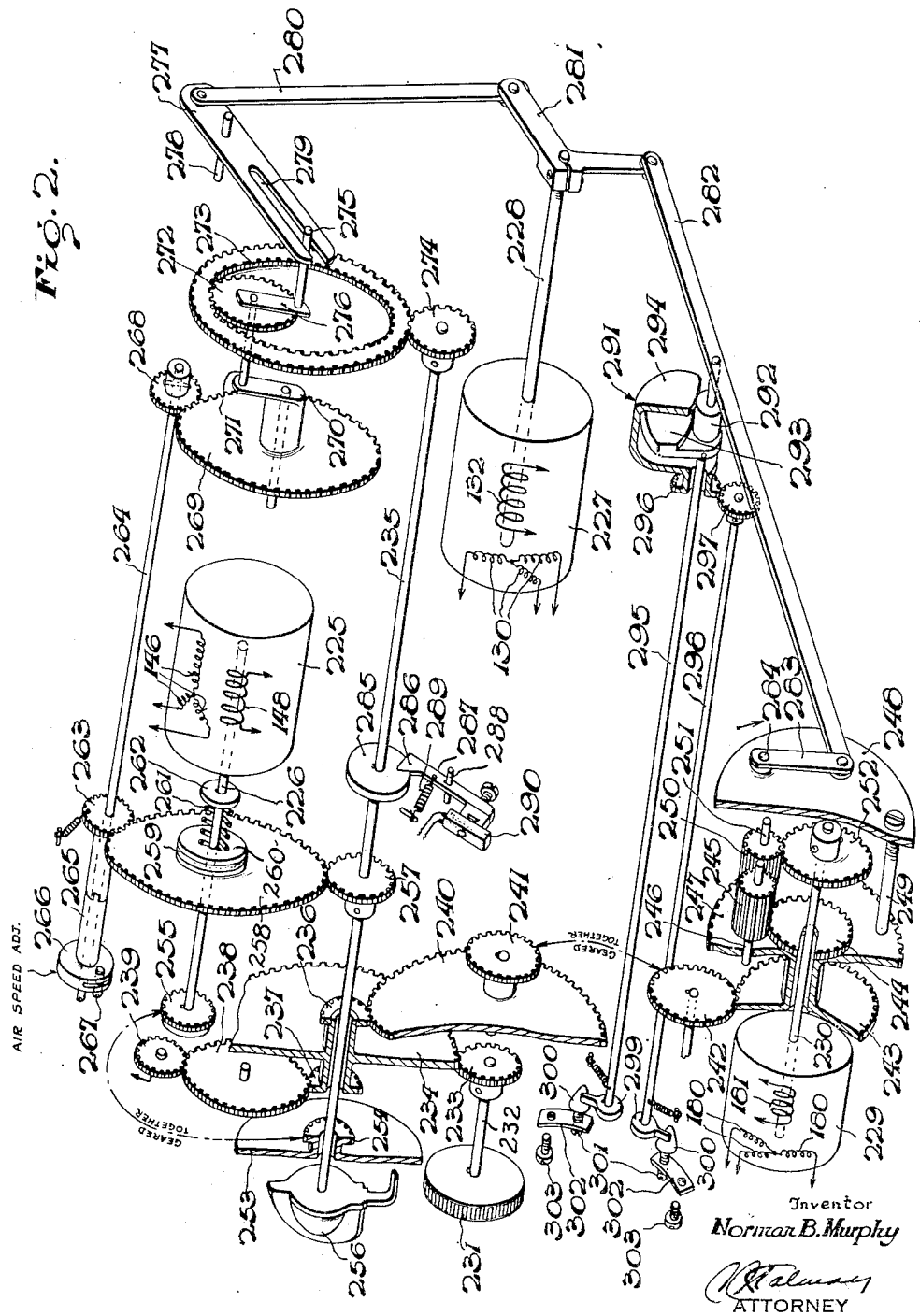

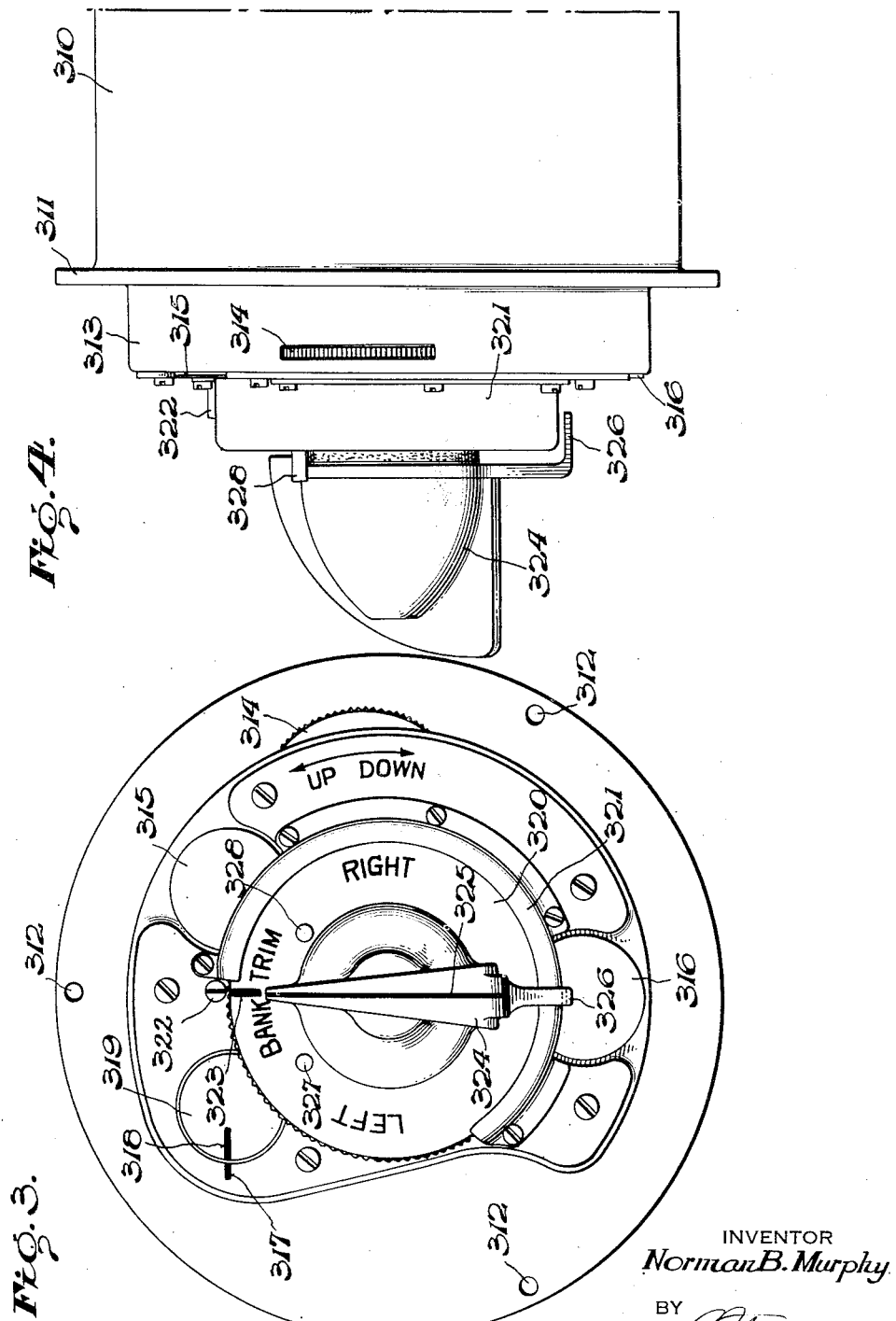

2,516,641

UNITED STATES PATENT OFFICE 2,516,641

AUTOMATIC PILOT CONTROL

Norman B. Murphy, West Englewood, N. J., assignor to Bendix Aviation Corporation, Teterboro, N. J., a corporation of Delaware Application July 13, 1945, Serial No. 604,861

18 Claims. (Cl. 244—77)

This invention relates generally to automatic pilot or control systems for dirigible craft and more particularly to novel automatic turn provisions therefor and as such constitutes an improvement over the automatic turn control unit of copending application Serial No. 585,236, filed May 22, 1945, which, in turn, constitutes a division of application Serial No. 516,489, filed December 31, 1943.

An object of the present invention is to provide a novel, compact and simple turn control unit for aircraft automatic pilots or the like.

Another object of the invention is to provide a novel turn control mechanism for an aircraft automatic pilot whereby craft attitude may be changed while the automatic pilot is engaged.

A further object is to provide a novel turn control unit for an aircraft automatic pilot whereby in response to manual adjustments of controls on the front of the unit, pitch, bank and rudder signals can be modified and the craft made to execute coordinated maneuvers while with the turn adjustments centered the craft assumes straight flight.

The above and other objects and advantages of the present invention will appear more fully hereinafter from a consideration of the detailed description which follows, taken together with the accompanying drawings wherein one embodiment of the invention is illustrated.

In the drawings, wherein like reference characters refer to like parts throughout the several views, Figure 1 is a diagrammatic illustration of an automatic control system for dirigible craft embodying the novel automatic turn control unit of the present invention;

Figure 2 is a detailed schematic illustration of the novel turn control unit of the present invention;

Figure 3 is a front elevation view of one practical embodiment of the control panel for operating the novel turn mechanism of Figure 2; and, Figure 4 is a side elevation view of the turn panel of Figure 3 illustrating the arrangement of the turn, bank and pitch knobs thereon.

Figure 1:
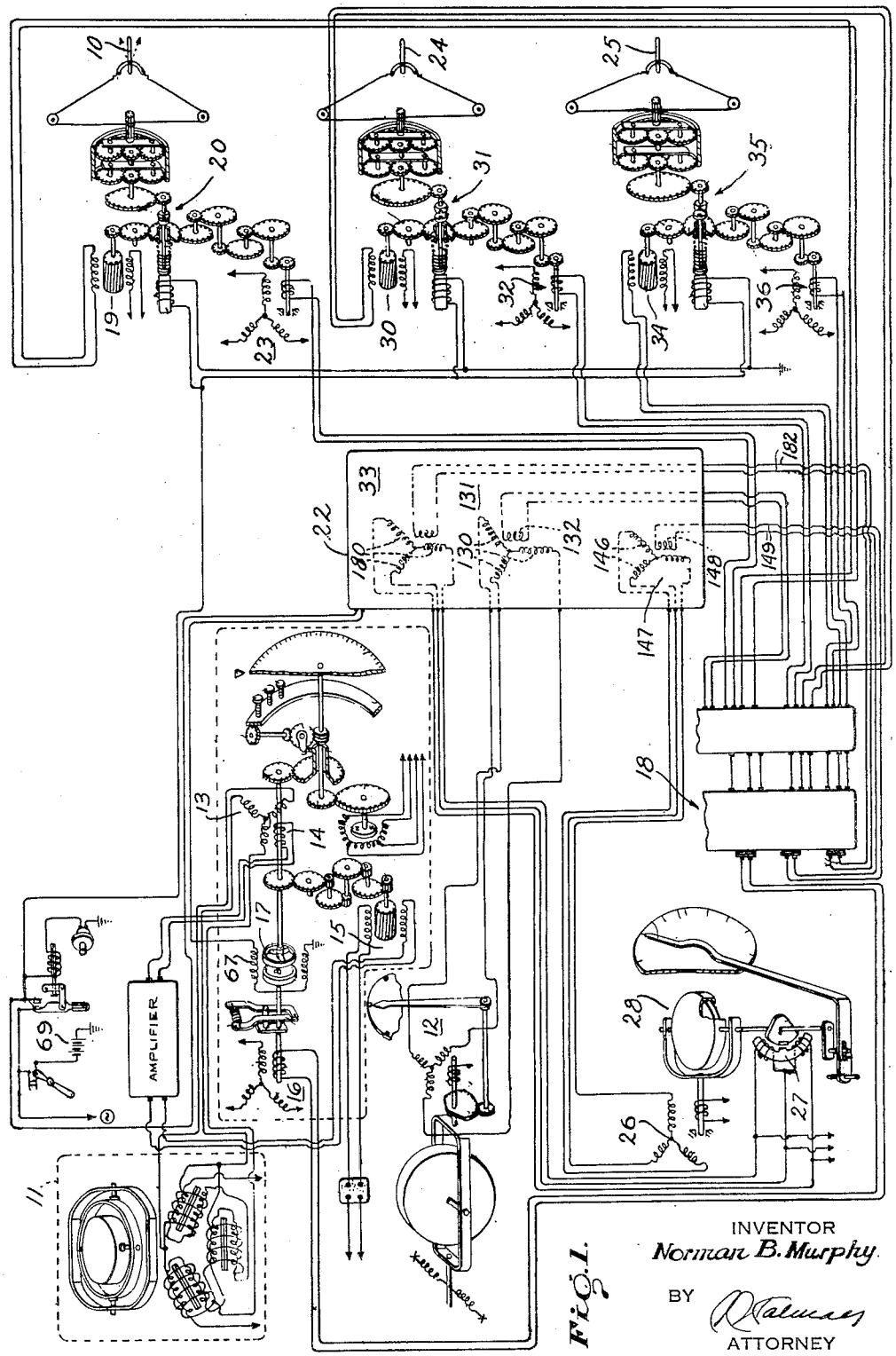

Referring now to the drawings for a more detailed description of the present invention and more particularly to Figure 1 thereof, it is there shown as embodied in an all electric automatic pilot providing three axes of control, claimed and described more fully in copending application Serial No. 516,488, filed December 31, 1943.

As more fully described in the latter application, the control of rudder 10 as shown in Figure 1, is derived from a gyro stabilized earth inductor type compass 11 and a rate of turn gyro pickoff 12. The compass includes an inductive coupling device 13 having an angularly movable rotor 14, a motor 15 for displacing rotor 14, a compass signal transmitter 16, and a magnetic clutch 17 for coupling the rotor 14 with the signal transmitter under certain conditions. The compass signal transmitter is connected with the rudder channel of an amplifier 18, the output of which energizes a servo motor 19 connected to the rudder through a clutch 20. The rate signal of pick-off 12 is also impressed on the rudder channel of the amplifier through an inductive rate or turn receiver device 131, comprising a wound stator 130 and an inductively coupled wound rotor 132, arranged within the novel controller unit of the present invention, generally designated with the reference character 22, to be described more fully hereinafter. Operation of rudder motor 19 displaces rudder 10 and also an inductive follow-up device 23 developing in the latter a follow-up signal which is impressed on the rudder channel of the amplifier to be mixed with the displacement and rate signals.

Signals for operating aileron and elevator surfaces 24 and 25, on the other hand, are developed by bank and pitch take-offs 26 and 27 arranged about the bank and pitch axes of an artificial horizon gyro 28. As a result of a banked condition, take-off 26 developes a bank signal which is coupled to the input of the aileron channel of amplifier 18 through an inductive bank receiver device 147, comprising a wound stator 146 and an inductively coupled wound rotor 148, located within unit 22, the output of the channel being connected to energize a servo motor 30 which connects through a clutch 31 with the aileron surface 24. Operation of motor 30 displaces an inductive follow-up device 32 developing a follow-up signal therein which is impressed upon the bank signal in the amplifier to modify operation of the motor 30. In a similar manner, as a result of a pitch condition, take-off 27 developes a pitch signal which is communicated to the input of the elevator channel of amplifier 18 through an inductive pitch receiver device 33, comprising a wound stator 180 and an inductively wound rotor 181 likewise located within unit 22, the output of the pitch channel being connected to energize the servo motor 34 which connects through a clutch 35 with elevator surface 25, the operation of the motor displacing an inductive follow-up device 36 developing a follow-up signal therein which is impressed on the pitch signal in the amplifier to modify operation of motor 34.

Coming now to the automatic turn control mechanism and the novel control unit constituting the subject matter of the present invention, the latter is shown schematically in Figure 2 as embodying an inductive bank device 225 having the wound stator 146 of Figure 1 and the inductively coupled rotor 148 carried by a shaft 226, an inductive rate device 227 having the wound stator 130 of Figure 1 and the inductively coupled rotor 132 carried by a shaft 228, and an inductive pitch device 229 having the wound stator 180 of Figure 1 and the inductively coupled rotor 181 carried by a shaft 230.

For the purpose of displacing rotor 181 of the pitch device 229 relative to its stator 180 to thereby generate a signal for energizing the elevator servo motor 34 for displacing elevator 25 to trim the craft in pitch, a pitch trim knob 231 is provided on a shaft 232 having a pinion 233 for engagement with a relatively large gear 234 sleeved loosely on a turn shaft 235. Gear 234 is provided with two toothed hubs 236 and 237, the latter engaging a gear 238 which is in mesh with a gear 239 having a marker thereon (not shown) for cooperation with a fixed index (not shown) to designate the instantaneous position of rotor 181 while the former meshes with a large gear 240 carrying a pinion 241 for meshing with an idler 242 which, in turn, drives a differential comprising a gear 243, sleeved on rotor shaft 230, having a gear 244 in mesh with a gear 245 journalled by a shaft 246 within plates 247, 248 of the differential, the plates being secured together by bolts 249 to define a cage. Gear 245 meshes with a gear 250 which is supported by a shaft 251 journalled within plates 247, 248 and which, further, meshes with a gear 252 pinned to rotor shaft 230. Thus, angular displacement of pitch trim knob 231 ultimately resolves itself into angular displacement of rotor 181 in either direction whereupon signals are developed therein and communicated by way of leads 182 to the input of amplifier 18 for energization of motor 34 of the elevator servo system.

For the purpose of displacing rotor 148 of the bank device 225 relative to its stator 146 to thereby generate a signal for energizing the aileron servo motor 30 for displacing aileron 24 to trim the craft in bank, a bank trim knob 253 is loosely sleeved on turn shaft 235 and is provided with a pinion 254 which is in engagement with a gear 255 fastened to rotor shaft 226. By manipulating knob 253, therefore, rotor 148 is displaced directly relative to its stator whereupon signals are developed in the rotor and communicated by way of leads 149 to the input of amplifier 18 for the energization of motor 30 of the aileron servo system, it being noted that in both cases pitch and bank signals are developed at the panel independently of the gyro horizon or master instrument 28.

In order to place a craft provided with the all electric, automatic pilot hereinabove described into an automatic turn, turn shaft 235 is provided with a turn knob 256, the shaft, in turn, having fastened thereto a gear 257 which is in engagement with a relatively large gear 258 loosely sleeved on shaft 226. Gear 258 connects with shaft 226 through a slip clutch comprising a clutch face 259 carried by the gear and a cooperating clutch face 260 pinned to shaft 226 and urged into frictional engagement with face 259 by way of a spring member 261 resting between face 260 and a fixed disc 262 fastened to the shaft. Angular displacement of turn knob 256 manifests itself in angular motion of rotor 148 relative to its stator through gears 257, 258, clutch 259, 260 and shaft 226, motion of the latter causing bank trim knob 253 to follow motion of turn knob 256 by virtue of gears 254, 255.

In addition to the bank signal, the proper rudder and elevator signals are likewise set in by turn knob 256, the rudder signal being derived from the inductive rate device 227 which is connected through an adjustable air speed linkage with bank device 225 and the up-elevator signal being derived from the pitch device 229 which is connected through the differential with the rate device 227.

Motion of gear 258 as a result of the displacement of turn knob 256 resolves itself into motion of a gear 263 sleeved on an air speed adjustment shaft 264, the hub of gear 263 being yieldably urged into engagement with the hub 265 of a lock member 266 which is normally locked by way of a screw 267 to shaft 264. Motion of gear 263, therefore, is translated into movement of shaft 264 whose free end has fastened thereto a gear 268 adapted for driving a relatively large gear 269 which supports at its center by way of a bracket 270 a shaft 271 carrying a gear 272 which meshes with an internal gear 273, the outer periphery of the latter being toothed for driving engagement with a pinion 274 fastened to the free end of turn shaft 235. Assuming proper air speed adjustment, motion of turn knob 256 causes rotation of gear 268 and pinion 274 whereby both gear 269 and internal gear 273 move together so that a pin 275 secured by a bracket 276 to gear 272 moves in an arc and by so doing angularly displaces a lever 277 about a pivot 278, the lever having a relatively long slot 279 for cooperation with pin 275. Movement of lever 277 about pivot 278 produces up or down motion of a link 280 which connects with one end of a crank arm 281 fastened to rate rotor shaft 228, the remaining end of crank 281 having a link 282 secured thereto. By virtue of the foregoing connection, rotor 132 of inductive rate device 227 is displaced angularly relative to its stator whereupon signals are developed in the rotor and communicated by way of leads 133 to the rudder channel of amplifier 18.

As crank arm 281 is pivoted by link 280 to displace rotor 132 it also actuates link 282 whose free end is pivotally connected to a link 283 which is pivotally secured at 284 to plate 248 of the pitch differential. Inasmuch as link 283 is connected to one side of plate 248 and is also engaged by a pitch cam system to be presently described, movement of link 282 to the left or right will manifest itself in a clockwise rotation only of plates 247 and 248 and since gear 243 is locked at this point, gear 245 will creep on gear 244, which is now fixed, to rotate gear 252 and angularly displace rotor 181 through gear 250 so that for either left or right turn an up-elevator signal will be generated and communicated by way of leads 182 to the elevator servo channel of amplifier 18.

In addition to gears 257 and 274, turn shaft 235 also carries a notched member 285 within whose notch rests a detent 286 carried by an arm 287 pivoted at 288 and yieldably urged to engage the notch by means of a yieldable member 289. When turn shaft 235 is displaced angularly, arm 287 is urged outwardly whereupon detent 286 leaves the notch while the opposite end of the arm, provided with a contact (not shown) is moved downwardly to open a pair of contacts (not shown), arranged within a conventional switch box 290, which normally connect a coil 67 of the magnetic clutch 17 at the master indicator with a battery 69. Opening of the contacts by angular displacement of the turn shaft, therefore, de-energizes coil 67 so that the direction signal from the inductor compass is disconnected during a turn from the rudder servo channel.

If it is desired to adjust the airspeed linkage for a cruising or some other speed, it is only necessary to remove screw 267 from lock member 266 whereby shaft 264 becomes free of member 266 and may be rotated to any desired extent as a result of which gear 269 is displaced relative to internal gear 273 which is held fast by gear 274, its shaft 235 being locked by detent 286, whereupon gear 272 creeps within the internal gear to displace pin 275 linearly relative to slot 279 of lever 277. This adjustment, therefore, determines the amount of motion of lever 277 and rate rotor 132 for a given setting of turn knob 256, the pin 275 being positioned for cruising speeds substantially as shown in Figure 2 and it is moved inwardly for increasing air speeds so that for extremely high speeds little or no displacement is obtained on the part of rotor 132.

A novel adjustment is also provided in the nature of a pitch cam system generally designated with the character 291 to insure proper initial setting of link 282 whereby for given rates of turn in either a left or right direction enough displacement of rotor 181 will be provided to maintain the craft in level attitude during turn, i. e., to prevent a nose-heavy or loss of altitude condition during a given turn. To this end, therefore, link 282 is provided with a roller 292 which engages with a pair of cams 293, 294, the former being fixed to a shaft 295 and the latter being hollow and sleeved on the shaft and provided with a gear 296 for meshing with a pinion 297 carried by a second and parallel shaft 298. Adjustment of the two cams defines the limit of downward throw of roller 292 for a given left or right motion of link 282 and consequently the amount of displacement of rotor 181 for a given set turn. Shafts 295 and 298 are provided at their free ends with collars 299 having lugs normally yieldably urged into engagement with longitudinally movable cones 300 engaged by adjusting screws 301. The screws are provided with straps 302 which normally lock screws 301 in a given position but upon loosening of other screws 303, the straps are actuated to unlock screws 301 and adjustment thereof will urge the cones relative to the lugs whereby shafts 295 and 298 are displaced angularly to set cams 293, 294 as desired.

It will now be readily apparent to those skilled in the art that by operating turn knob 256 bank, rate and pitch signals are developed in inductive devices 225, 227 and 229 independently of their respective master instruments whereby the aileron, rudder and elevator surfaces are deflected the proper amount to place the craft in a turn attitude, surface deflection continuing until the follow-back signals of inductive devices 23, 32 and 36 (Figure 1) are equal and opposite to the bank, rate and pitch signals of devices 225, 227 and 229. As the correct craft attitude is attained, signals are generated by the master instruments, i. e., rate take-off 12 and the bank and pitch take-offs arranged at gyro 18 to wash out the signals developed by devices 225, 227 and 229. The follow-back signals, at this point, being at a maximum act alone in reversing servo motors 19, 30 and 34 to center the rudder, aileron and elevator surfaces, the craft remaining in the desired banked attitude. Moreover, should the craft depart from such attitude the master instruments will operate to return the craft to the desired attitude. Once the new course is attained, turn knob 256 is centered manually to set the craft on the new course and switch 290 is closed to energize coil 67 of clutch 17 the master indicator whereby the compass takes over and maintains control of the rudder.

One practical embodiment of a control panel for controlling the novel mechanism of Figure 2 is shown in Figures 3 and 4 and as there illustrated, a housing 310 is provided for enclosing the mechanism of Figure 2 which is supported by a casing (not shown) arranged within the housing and having a flange 311 provided with openings 312 for securing the unit to the craft. Fastened to the front of flange 311 is a substantially annular and hollow member 313 accommodating therein the pitch trim knob 314 corresponding to knob 231 of Figure 2. Member 313 is provided with two removable caps 315 and 316 which cover respectively, the free end of air speed adjustment shaft 264 of Figure 2 and the screws 301 and 303 of the pitch cam system 291.

Inscribed on member 313, furthermore, is a fixed reference marker 317 with which cooperates a pitch marker 318 carried by an angularly movable disc 319 fastened to gear 239 of Figure 2. Thus, angular motion of pitch trim knob 314 provides angular displacement in either direction of pitch rotor 181 of Figure 2 through gears 233, 234, 236, 240, 241, 242, 243 and 244—252 and simultaneously through gears 237, 238 and 239 displaces marker 318 relative to marker 317 to indicate the displacement from null of the pitch rotor.

Superimposed over member 313 is the bank trim knob 320 having a knurled periphery, the knob corresponding to bank trim knob 253 of Figure 2, the major portion of knob 320 being provided with a shield 321 secured to member 313. Arranged on member 313 is a pin 322 whose front end defines a fixed marker or reference against which trim knob 320 is operated, the latter knob having a marker 323 thereon which, when aligned with pin 322, indicates that rotor 148 of bank device 225 is at a normally null position. Moreover, knob 320 may be provided with "Left" and "Right" designations as shown to inform the pilot of the direction of the bank trim set in by the knob relative to marker pin 322. Angular displacement of bank knob 320, as explained in connection with knob 253 of Figure 2, displaces rotor 148 of bank device 225 directly in either direction by way of gears 254 and 255.

A turn knob 324, corresponding to turn knob 256 of Figure 2, is superimposed over bank trim knob 320 and is provided with a reference line 325 thereon which, when aligned with markers 322 and 323, indicates the craft to be in straight flight. The lower end of knob 324 is provided with a stop member 326 adapted for limiting angular movement of the knob by engagement with either of limit pins 327 or 328 carried on bank knob 320. Displacement of turn knob 324 to the right or left of marker pin 322 results in motion of shaft 235 of Figure 2 as well as gears 257 and 258 to displace rotor 148 of the bank device and shaft 264 of the airspeed linkage, displacement of shaft 226 resulting in displacement of gears 254, 255 whereby bank trim knob 320 follows motion of the turn knob. Simultaneously, gear 274 on the turn shaft is rotated to turn internal gear 273 whereby rotor 132 of the rate device 227 is displaced angularly through the airspeed linkage and rotor 181 of pitch device 229 is displaced through the pitch cam system 291. In addition to the foregoing displacements resulting in maneuvering the craft into a turn, operation of knob 324 results in the opening of switch 290 whereupon the compass system is disconnected from the rudder servo channel of amplifier 18 as heretofore explained.

The novel automatic turn control mechanism including the compact panel arrangement therefor is of such a character that extreme flexibility of control is provided by the automatic pilot which makes it possible to execute maneuvers by turning appropriate controls on the panel. Sharply banked turns may be made by actuation of turn control knob 324, the craft immediately returning to straight flight when the knob is returned to its central position. Bank and pitch trim is immediately available upon operation of knobs 320 and 314. Steep climbs or dives may be made by operating pitch trim knob 314. Moreover, a combination of turns and climbs or turns and dives may also be executed or the craft quickly thrown from a correctly banked turn in one direction to a correctly banked turn in an opposite direction.

Although but a single embodiment of the invention has been illustrated and described in detail, it is to be expressly understood that the invention is not limited thereto. Various changes may also be made in the design and arrangement of the parts without departing from the spirit of the invention, as the same will now be understood by those skilled in the art.

I claim:

1. In an automatic pilot for aircraft having rudder, aileron and elevator actuating motors and master instruments for normally operating said motors, a control panel for said pilot, means mounted on one side of said panel and interconnected with one of the master instruments and the rudder motor so as to normally have a signal reproduced therein proportional to the turn by said shaft from a prescribed direction for operating said rudder motor, means mounted on said one side of said panel and interconnected with the other of the master instruments and the aileron and elevator motors so as to have signals normally reproduced therein proportional to the bank and pitch of said craft when said craft departs from a prescribed attitude for operating said aileron and elevator motors, an airspeed linkage interconnecting said bank and turn signal reproducing means, means comprising a differential interconnecting said turn and pitch signal reproducing means, and a turn control on the opposite side of said panel drivably connected with said bank signal reproducing means for simultaneously actuating said turn, pitch and bank signal reproducing means for generating signals for operating said rudder, aileron and elevator motors independently of the master instruments.

2. In an automatic pilot for aircraft having rudder, aileron and elevator actuating motors and master instruments for normally operating said motors, a control panel for said pilot, means mounted on one side of said panel and interconnected with one of the master instruments and the rudder motor so as to normally have a signal reproduced therein proportional to the turn by said craft from a prescribed direction for operating said rudder motor, means mounted on said one side of said panel and interconnected with other of the master instruments and the aileron and elevator motors so as to have signals normally reproduced therein proportional to the bank and pitch of said craft when said craft departs from a prescribed attitude for operating said aileron and elevator motors, a linkage interconnecting said bank and turn signal reproducing means, a differential mechanism interconnecting said turn and pitch signal reproducing means, a turn control on the opposite side of said panel drivably connected with said bank signal reproducing means for simultaneously actuating said turn, pitch and bank signal reproducing means for generating signals for operating the rudder, aileron and elevator motors independently of said master instruments, and a pitch trim control on said opposite side of said panel drivably connected with said pitch signal reproducing means for overriding the control of the latter by said turn control.

3. In an automatic pilot for aircraft having rudder, aileron and elevator actuating motors and master instruments for normally operating said motors, a control panel for said pilot, means on one side of said panel interconnected with one of the master instruments and the rudder motor so as to have a signal normally reproduced therein in proportion to the turn of said craft when said craft departs from a prescribed course for operating said rudder motor, second and third means on said opposite side of said panel interconnected with other of the master instruments and the aileron and elevator motors so as to have signals normally reproduced therein in response to the bank and pitch respectively of said craft due to its departure from a prescribed attitude for operating said aileron and elevator motors, a pitch trim knob on the opposite side of said panel for actuating said pitch signal reproducing means to trim the craft in pitch, a bank trim knob on said opposite side of said panel for actuating said bank signal reproducing means to trim the craft in bank, and a turn knob aligned with and superimposed over said bank trim knob for simultaneously actuating said turn, bank and pitch signal reproducing means for generating signals for operating said rudder, aileron and elevator motors independently of the master instruments.

4. In an automatic pilot for aircraft having rudder, aileron and elevator actuating motors and master instruments for normally operating said motors, a control panel for said pilot, means on one side of said panel interconnected with one of the master instruments and the rudder motor so as to have a signal normally reproduced therein in proportion to the turn of said craft when said craft departs from a prescribed course for operating said rudder motor, second and third means on said opposite side of said panel interconnected with the other of the master instruments and the aileron and elevator motors so as to have signals normally reproduced therein in response to the bank and pitch respectively of said craft due to its departure from a predetermined attitude for operating the aileron and elevator motors, a bank trim knob on said opposite side of said panel for actuating said bank signal reproducing means to trim said craft in bank, means including a turn knob aligned with and superimposed over said bank trim knob for simultaneously actuating said turn, bank and pitch signal reproducing means for generating signals for operating said rudder, aileron and elevator motors independently of the master instruments, a pitch trim knob on said opposite side of said panel for actuating said pitch signal reproducing means independently of said turn knob, and an indicator on said panel operable by said pitch trim knob.

5. A control unit for an aircraft automatic pilot having rudder, aileron and elevator actuating motors together with master instruments for normally operating said motors, comprising a casing, an inductive turn signal device within said casing for operating said rudder motor independently of its related master instrument, an inductive bank signal device within said casing for operating said aileron motor independently of its related master instrument, an inductive pitch signal device within said casing for operating said elevator motor independently of its related master instrument, an airspeed linkage interconnecting said turn and bank devices, a differential mechanism interconnecting said turn and pitch devices, and a turn control knob exterior of said casing drivably connected with said bank device for actuating said bank, turn and pitch devices simultaneously.

6. A control unit for an aircraft automatic pilot having rudder, aileron and elevator actuating motors together with master instruments for normally operating said motors, comprising a casing, an inductive turn signal device within said casing for operating said rudder motor independently of its related master instrument, an inductive bank signal device within said casing for operating said aileron motor independently of its related master instrument, an inductive pitch signal device within said casing for operating said elevator motor independently of its related master instrument, an airspeed linkage interconnecting said turn and bank devices, a differential mechanism interconnecting said turn and pitch devices, a bank trim knob exterior of said casing and drivably connected to said bank device for the actuation thereof, a turn control knob exterior of said casing, and means including a friction clutch drivably connecting said turn knob with said bank device whereby in response to the operation of said turn knob said bank, turn and pitch devices as well as said bank trim knob are actuated simultaneously.

7. A control unit for an aircraft automatic pilot having rudder, aileron and elevator actuating motors together with master instruments for normally operating said motors, comprising a casing, inductive bank, turn and pitch signal devices within said casing for actuating said rudder, aileron and elevator motors independently of their related master instruments, an airspeed linkage interconnecting said turn and bank devices, a differential mechanism interconnecting said turn and pitch devices, a turn control knob rotatably mounted exterior of said casing and connected with said bank device for actuating said bank, turn and pitch devices simultaneously, a pair of spaced limit members, and a stop member carried by said turn knob for engagement with said limit members to thereby restrict rotation in either direction of said knob.

8. A control unit for an aircraft automatic pilot having rudder, aileron and elevator actuating motors together with master instruments for normally operating said motors, comprising a casing and a control panel attached thereto, inductive bank, turn and pitch devices within said casing for operating said rudder, aileron and elevator motors independently of their related master instruments, pitch trim and bank trim knobs on said panel connected with said pitch and bank devices, and a turn knob on said panel coaxial with and superimposed over said bank trim knob for actuating said bank, turn and pitch devices simultaneously.

9. A control unit for an aircraft automatic pilot having rudder, aileron and elevator actuating motors together with master instruments for normally operating said motors, comprising a casing and a control panel attached thereto, inductive bank, turn and pitch devices within said casing for operating said rudder, aileron and elevator motors independently of their related master instruments, a bank trim knob on said panel and drivably connected with said bank device for the actuation thereof, a turn knob on said panel coaxial with and superimposed over said bank trim knob, means comprising a friction clutch for drivably connecting said turn knob with said bank device whereby upon actuation of said turn knob said bank device is operated, and means interconnecting said bank device with said turn and pitch devices for simultaneous operation with said bank device.

10. In a control unit for an aircraft automatic pilot having rudder and aileron actuating motors and master instruments for normally operating said motors, the combination with a bank inductive device and a turn inductive device for actuating said aileron and rudder motors, respectively, independently of their related master instruments, of an airspeed linkage for connecting said bank inductive device with said turn inductive device comprising, a slotted pivoted lever operatively connected to said turn inductive device, means comprising a pin for cooperation with the slot of said lever, and means for actuating said bank inductive device and simultaneously said pin to oscillate said lever to thereby operate said turn inductive device.

11. In a control unit for an aircraft automatic pilot having rudder and aileron actuating motors and master instruments for normally operating said motors, the combination with a bank inductive device and a turn inductive device for actuating said aileron and rudder motors, respectively, independently of their related master instruments, of an airspeed linkage for connecting said bank inductive device with said turn inductive device comprising, a slotted pivoted lever operatively connected to said turn inductive device, means comprising a pin for cooperation with the slot of said lever, means including an internal gear for operating said pin to oscillate said lever to thereby operate said turn inductive device, and means for actuating said bank inductive device and said internal gear whereby said turn inductive device is operated simultaneously with said bank inductive device.

12. In a control unit for an aircraft automatic pilot having rudder and aileron actuating motors and master instruments for normally operating said motors, the combination with a bank inductive device and a turn inductive device for actuating the aileron and rudder motors, respectively, independently of their related master instruments, of an airspeed linkage for connecting said bank inductive device with said turn inductive device comprising, a slotted and pivotally mounted lever operatively connected to said turn inductive device, a pin arranged in the slot of said lever to oscillate said lever to thereby actuate said turn inductive device, means comprising an internal gear for operating said pin to oscillate said lever, means for actuating said bank inductive device and said internal gear, and means supporting said pin and adapted to move said pin relative to said gear and said slot to thereby vary the oscillation of said lever for a given operation of said bank inductive device.

13. In a control unit for an aircraft automatic pilot having rudder and aileron actuating motors and master instruments for normally operating said motors, the combination with a bank inductive device and a turn inductive device for actuating the aileron and rudder motors, respectively, independently of their related master instruments, of an airspeed linkage for connecting said bank inductive device with said turn inductive device comprising, a slotted and pivotally mounted lever operatively connected to said turn inductive device, a pin arranged in the slot of said lever to oscillate said lever to thereby actuate said turn inductive device, a gear supporting said pin, means comprising an internal gear in engagement with said last-named gear to actuate said pin, means adapted to move said supporting gear relative to said internal gear to thereby move said pin relative to said slot to vary the oscillation of said lever for a given operation of said bank inductive device, and means for actuating said bank inductive device and said internal gear.

14. A control unit for an aircraft automatic pilot having rudder and aileron actuating motors and master instruments for normally operating said motors, comprising a casing and a control panel attached thereto, inductive bank and turn devices within said casing for actuating said motors independently of their related master instruments, a linkage connecting said bank device with said turn device and comprising a slotted and pivotally mounted lever operatively connected to said turn device, a pin cooperating with the slot of said lever, means for actuating said pin to oscillate said lever, means for variably displacing said pin relative to the slot of said lever to thereby vary the lever length of the latter. an airspeed adjustment on said panel for operating said displacing means, and means comprising a turn control on said panel for simultaneously operating said bank device and said pin actuating means.

15. A control unit for an aircraft automatic pilot having rudder and aileron actuating motors and master instruments for normally operating said motors, comprising a casing and a control panel attached thereto, inductive bank and turn devices within said casing for actuating said motors independently of their related master instruments, a linkage connecting said bank device with said turn device and comprising a slotted and pivotally mounted lever operatively connected to said turn device, a pin arranged in the slot of said lever to oscillate said lever to thereby actuate said turn device, a gear for supporting said pin, means comprising an internal gear in engagement with said last-named gear to actuate said pin, normally locked adjustment means connected with said supporting gear and adapted to move the latter relative to said internal gear to thereby move said pin relative to said slot to vary the oscillation of said lever for a given operation of said bank device, an airspeed adjustment on said panel for operating said adjustment means, and means comprising a turn control on said panel for simultaneously operating said bank device and said pin actuating means.

16. A control unit for an aircraft automatic pilot having rudder, aileron and elevator actuating motors and master instruments for normally operating said motors, comprising a casing and a control panel attached thereto, inductive bank, turn and pitch devices within said casing for actuating said motors independently of the related master instruments, a linkage interconnecting said bank and turn devices, a differential mechanism connected with said pitch device, a link for interconnecting one side of said differential mechanism with said turn device, cam means in engagement with said link to govern the motion of said link transmitted to said differential mechanism for a given operation of said turn device, and a turn control on said panel drivably connected with said bank device for actuating said bank, turn and pitch devices in unison.

17. A control unit for an aircraft automatic pilot having rudder, aileron and elevator actuating motors and master instruments for operating said motors, comprising a casing and a control panel attached thereto, inductive bank, turn and pitch devices within said casing for actuating said motors independently of their related master instruments, a linkage interconnecting said bank and turn devices, a differential mechanism connected with said pitch device, a link for interconnecting one side of said differential mechanism with said turn device, cam means in engagement with said link to govern the motion of said link transmitted to said differential mechanism for a given operation of said turn device, adjustment means on said panel for presetting the position of said cam means relative to said link, and a turn control on said panel drivably connected with said bank device for actuating said bank, turn and pitch devices in unison.

18. A control unit for an aircraft automatic pilot having rudder, aileron and elevator actuating motors and master instruments for normally operating said motors, comprising a casing and a control panel attached thereto, inductive bank, turn and pitch devices within said casing for actuating said motors independently of said master instruments, a linkage interconnecting said bank and turn devices, a differential mechanism connected with said pitch device, means for interconnecting one side of said differential mechanism with said turn device, a turn control on said panel drivably connected with said bank device for actuating said bank, turn and pitch devices in unison, a gear train operatively connected to the opposite side of said differential mechanism, and a pitch trim control on said panel for actuating said gear train to operate said pitch device independently of said turn control.

NORMAN B. MURPHY.

REFERENCES CITED

The following references are of record in the file of this patent:

UNITED STATES PATENTS

| Number | Name | Date |
| --- | --- | --- |
| 2,137,974 | Fischel | Nov. 22, 1938 |
| 2,203,671 | Carlson | June 11, 1940 |
| 2,401,354 | Holt | June 4, 1946 |
| 2,442,116 | Carlson | May 25, 1948 |

Certificate of Correction

Patent No. 2,516,641　　　　　　　　　　　　　　　　　　　　　　　July 25, 1950

NORMAN B. MURPHY

It is hereby certified that error appears in the printed specification of the above numbered patent requiring correction as follows:

Column 7, line 50, for the word "shaft" read *craft*;

and that the said Letters Patent should be read as corrected above, so that the same may conform to the record of the case in the Patent Office.

Signed and sealed this 14th day of November, A. D. 1950.

[SEAL]

THOMAS F. MURPHY,
*Assistant Commissioner of Patents.*